US006631381B1

(12) United States Patent
Couch et al.

(10) Patent No.: US 6,631,381 B1
(45) Date of Patent: Oct. 7, 2003

(54) SYSTEM AND METHOD FOR REFERENCING A USER-GENERATED COPY OF A CATALOG

(75) Inventors: Tanya Couch, San Jose, CA (US); Catherine Elizabeth Wuebker Drummond, Morgan Hill, CA (US); Virginia Walbridge Hughes, Jr., Hollister, CA (US); Theresa Hsing Lai, Saratoga, CA (US); Joseph Davis Lea, III, Chapel Hill, NC (US); David Harold Oberstadt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,994

(22) Filed: Jan. 13, 2000

Related U.S. Application Data

(62) Division of application No. 08/949,636, filed on Oct. 14, 1997, now Pat. No. 6,243,703.

(51) Int. Cl.[7] .............................................. G06F 17/00
(52) U.S. Cl. ....................................................... 707/102
(58) Field of Search ................................ 707/1, 3, 102, 707/100

(56) References Cited

U.S. PATENT DOCUMENTS

| 5,345,585 A | | 9/1994 | Iyer et al. ...................... 707/2 |
| 5,596,745 A | | 1/1997 | Lai et al. .................. 707/103 R |
| 5,630,125 A | * | 5/1997 | Zellweger .................... 707/102 |
| 5,642,510 A | * | 6/1997 | Shiga et al. ................. 717/164 |
| 5,713,018 A | | 1/1998 | Chan ............................. 707/10 |
| 5,740,425 A | * | 4/1998 | Provilus ...................... 707/100 |
| 5,787,411 A | | 7/1998 | Groff et al. ..................... 707/2 |
| 5,819,086 A | * | 10/1998 | Kroenke ..................... 707/102 |
| 5,826,076 A | | 10/1998 | Bradley et al. ................. 707/4 |
| 5,862,378 A | | 1/1999 | Wang et al. ................. 717/114 |
| 5,864,856 A | * | 1/1999 | Young ........................ 707/100 |
| 5,873,096 A | | 2/1999 | Lim et al. .................... 707/201 |
| 6,055,516 A | * | 4/2000 | Johnson et al. ............... 705/27 |
| 6,115,704 A | * | 9/2000 | Olson et al. .................... 707/3 |

OTHER PUBLICATIONS

Batty, P.; Is Mainstream Database Technology Ready for AM/FM/GIS?; Proceedings AM/FM International, pp 3–11, Published: Aurora, CO, USA, 1997, xv+798 pp.

* cited by examiner

Primary Examiner—Greta Robinson
(74) Attorney, Agent, or Firm—Kunzler & Associates

(57) ABSTRACT

An apparatus for integrally referencing a user-generated copy of a catalog in a database system includes a memory device having thereon modules of code for execution by a processor. The modules include a database system component module configured to refer to a catalog generated by the database system; and a catalog qualifier designation module communicating with the database system component module and configured to receive a user designation of a user-specified name for a user-generated copy of the catalog generated by the database system to be referenced in place of the catalog generated by the database system.

30 Claims, 8 Drawing Sheets

62

| Diagram 1 of 1    Statement: 223 | Information for Multiple Index Access ||
|---|---|---|
| *(tree diagram: MIXScan ← Intersect ← Intersect, IXS2 ← Union, IXS2 ← IXS4)* | Statistics | Current Value |
| ^ | Prefetch: | List Prefetch |
| ^ | Access Type: | M |
| ^ | Page range screening: | No |
| ^ | Column function evaluation: | Not applicable or to be decided at bind time |
| ^ | Selection details ||
| ^ | Indicates whether the table qualifies for page-range screening. With page-range screeening, plans scan only the partitions needed. ||

Fig. 5

SYSTEM AND METHOD FOR REFERENCING A USER-GENERATED COPY OF A CATALOG

RELATED APPLICATIONS

This application is a continuation-in-part of U.S. patent application Ser. No. 08/949,636 now U.S. Pat. No. 6,243,703 filed Oct. 14, 1997, for "Interpreting Data Using a Graphical User Interface," which is incorporated herein by reference.

BACKGROUND OF THE INVENTION

1. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. The Field of the Invention

The present invention relates generally to computer-implemented database systems. More specifically, the present invention relates to a system and method for referencing a user-generated copy of a catalog in a database system.

3. The Relevant Technology

Databases are computerized information storage and retrieval systems. Databases are managed by systems and may take the form of relational databases and hierarchical databases. A Relational Database Management System (RDBMS) is a database system which uses relational techniques for storing and retrieving data. Relational databases are organized into tables consisting of rows (tuples) and columns of data. A relational database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, the RDBMS is capable of accessing the requested data in a number of different manners. The RDBMS, therefore, attempts to select the manner that minimizes the computer time and resources (i.e. cost) for executing the query.

When the RDBMS determines how to execute the SQL statements, the set of steps created by the RDBMS for executing the SQL statements is commonly referred to as the "access path." In other words, the access path is a sequence of operations used by the RDBMS to obtain the data requested by the SQL query. Depending on the access path, an SQL statement might, for instance, search an entire table space, or it might use an index. The access path is a key to determining how well an SQL statement performs. The description of the access path is stored in a table often referred to as a "plan table," which typically stores the access path data for one or more SQL statements.

In addition to determining the access path, many databases estimate the cost (in CPU milliseconds or service units) for executing each SQL statement. Typically, the estimated costs are stored in a table, referred to in the case of DB2® for OS/390® as a "statement table." Like the plan table, the statement table generally stores the estimated statement costs for one or more SQL statements.

Moreover, some databases store information relating to user-defined functions in a table often referred to as a "function table." User-defined functions can be very useful in developing database applications. Accordingly, it is advantageous to have information relating to the user-defined functions in a single, convenient location.

Collectively, the above-described access path data, statement cost data, and function data, in addition to object statistic data, are referred to herein as "explain data." The plan table, statement table, and function table are referred to herein as "explain tables." As noted above, the explain data is typically generated at bind time. However, the explain data can also be generated dynamically in response to a user-supplied query statement.

Accordingly, many database systems, such as the RDBMS, provide a query explain program which is used to access the explain tables and provide the information within the explain tables to a user for user-selected queries. The query explain programs are in some instances configured to provide the information, referred to herein as query explain data, in a graphical manner, or in a manner otherwise readily comprehensible to a user.

In communicating with the database system, such query explain programs and other database system components must often refer to database organizational information. This information generally includes full description of the database, such as listings and names of tables, columns, and rows within the database. Such information is typically stored in a central location called the "system catalog," or merely, "the catalog."

Understandably, the catalog is highly utilized, especially where the database system has many different users, as can be found when organizations such as educational institutions or large corporations utilize the catalog from within many different departments and at many different locations.

Accordingly, when accessing the database system from database system components such as the query explain program it would be beneficial to be able to reference the catalog in a manner that would not increase the burden on the catalog and in a manner wherein the contents of the catalog can be quickly referenced. It would be further beneficial to be able to access the contents in such a manner from remote programs and remote locations across a network.

SUMMARY OF THE INVENTION

The present invention solves the foregoing problems by providing a system, method, and article of manufacture for referencing a user-generated copy of a catalog in a database system. In one aspect of the invention, an apparatus for referencing a user-generated copy of a catalog for a query explain program in a database system includes a processor for executing instructions and a memory device having thereon modules of operational data and executable code for execution by the processor.

In one embodiment, the modules include a database system component module configured to refer to a catalog generated by the database system. The modules also preferably include a catalog qualifier designation module communicating with the database system component module and configured to receive a user designation of a user-specified name for a user-generated copy of the catalog generated by the database system to be referenced in place of the catalog generated by the database system.

The database system component module may be a tool for use with the catalog system, such as a query explain program for relaying information regarding the manner of execution of selected queries to a user. In one embodiment, the database system is adapted for operation on a server and the database system component module is adapted for operation on a workstation communicating with the database system, and wherein the catalog and the user-generated copy of the catalog are stored on the server.

The catalog qualifier designation module may comprise a graphical user interface (GUI) window accessible from the database system component module. The GUI window preferably comprises a control mechanism for receiving the user designation of a user-specified name in place of the original name of the catalog generated by the database system.

The modules may also comprise a catalog referencing module. Preferably, the catalog referencing module is adapted to communicate with the catalog qualifier designation module, to receive the user-specified name for a user-generated copy of the catalog, and to consult the user-generated copy of the catalog for use by the database system component module. The catalog referencing module may also be adapted to reference the catalog generated by the database system in lieu of receiving the user-specified name for a user-generated copy of the catalog.

Preferably, the user-specified name comprises a high level qualifier, and may designate the maker of the user-generated copy of the catalog. In one embodiment, the database system component module references the user-designated catalog integrally as if the user-designated catalog were the catalog generated by the database system.

In another aspect of the invention, a method for referencing a user-generated copy of a catalog in a database system is provided and includes a step of receiving a user designation of a user-specified name for a user-generated copy of a catalog generated by the database system. The method also preferably comprises a step of referencing the user-generated copy in place of the catalog generated by the database system, using the designated user-specified name. The method may also comprise the step of creating a user-generated copy of the catalog created by the database system and giving the user-generated copy of the catalog a user-specified name.

In one embodiment, the step of receiving a user designation of a user-specified name comprises receiving a user designation of a user-specified name within a database system component module. Additionally, the database system component module may comprise an explain program for relaying information regarding query execution to a user.

The method may also comprise generating a graphical user interface window accessible from the database system component module. Preferably, the window comprises a control mechanism for receiving the user designation of a user-specified name in place of the original name of the catalog generated by the database system.

Thus, users may reference the catalog generated by the database system in lieu of receiving the user-specified name for a user-generated copy of the catalog. Preferably, the user-specified name comprises a high level qualifier, which may designate the maker of the user-generated copy of the catalog. Additionally, referencing the user-generated copy may comprise referencing the user-designated catalog integrally as if the user-designated catalog were the catalog generated by the database system.

In yet another aspect of the invention, an article of manufacture comprises a program storage medium readable by a processor and embodying one or more instructions executable by the processor to perform the above-described method for referencing a user-generated copy of a catalog in a database system.

These and other objects, features, and advantages of the present invention will become more fully apparent from the following description and appended claims, or may be learned by the practice of the invention as set forth in the following specification.

BRIEF DESCRIPTION OF THE DRAWINGS

These and other more detailed and specific objects and features of the present invention are more fully disclosed in the following specification, reference being had to the accompanying drawings, in which:

FIG. 5 is an illustration of a graphical representation of an access path according to one embodiment of the invention.

DETAILED DESCRIPTION OF THE PREFERRED EMBODIMENTS

The preferred embodiments of the present invention will be best understood by reference to the drawings, wherein like parts are designated by like numerals throughout. It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in the Figures, is not intended to limit the scope of the invention, as claimed, but is merely representative of presently preferred embodiments of the invention.

The Figures include schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
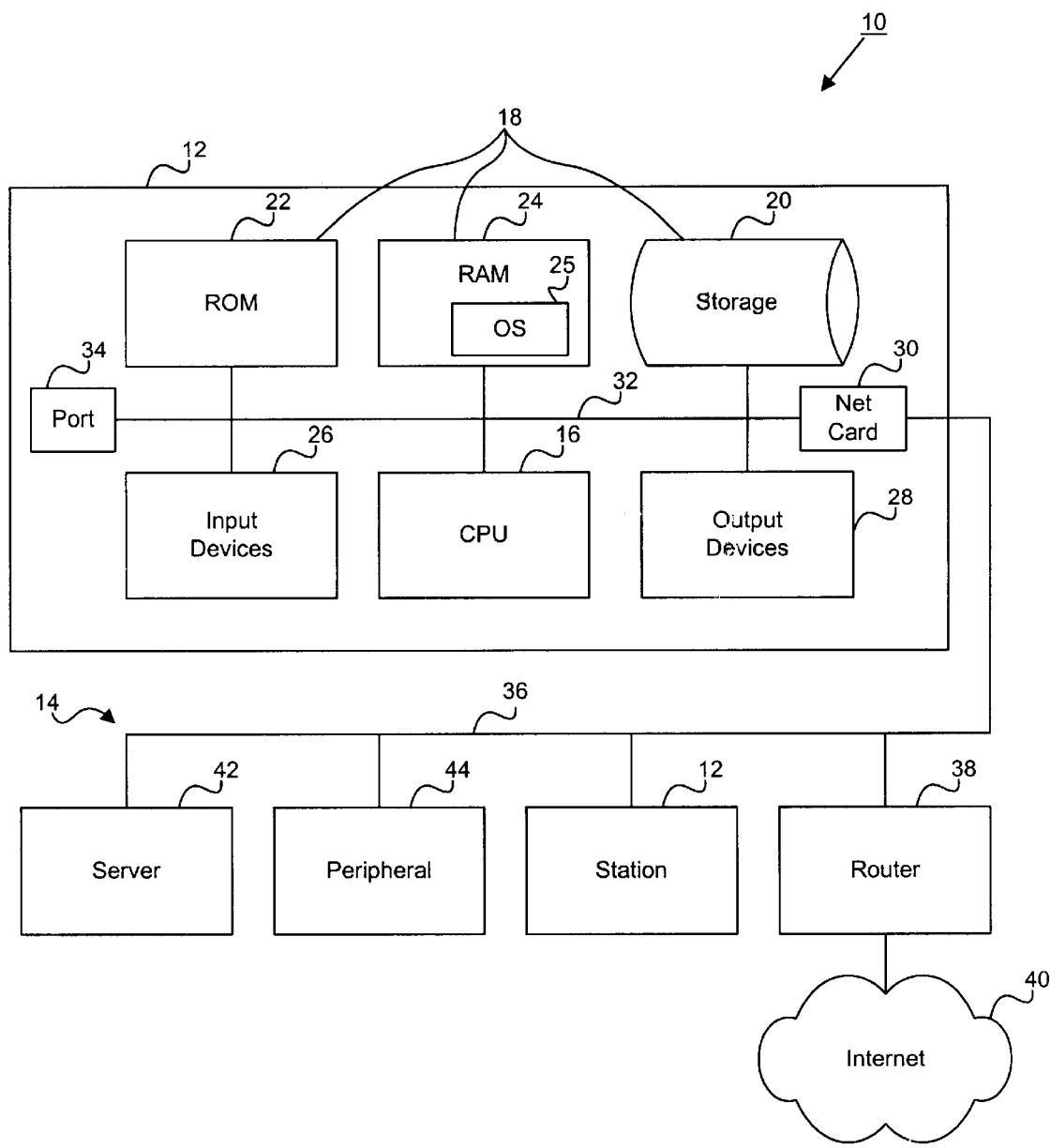
FIG. 1 is a schematic block diagram of a computer system suitable for implementing one embodiment of the invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIM®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an Intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPx, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
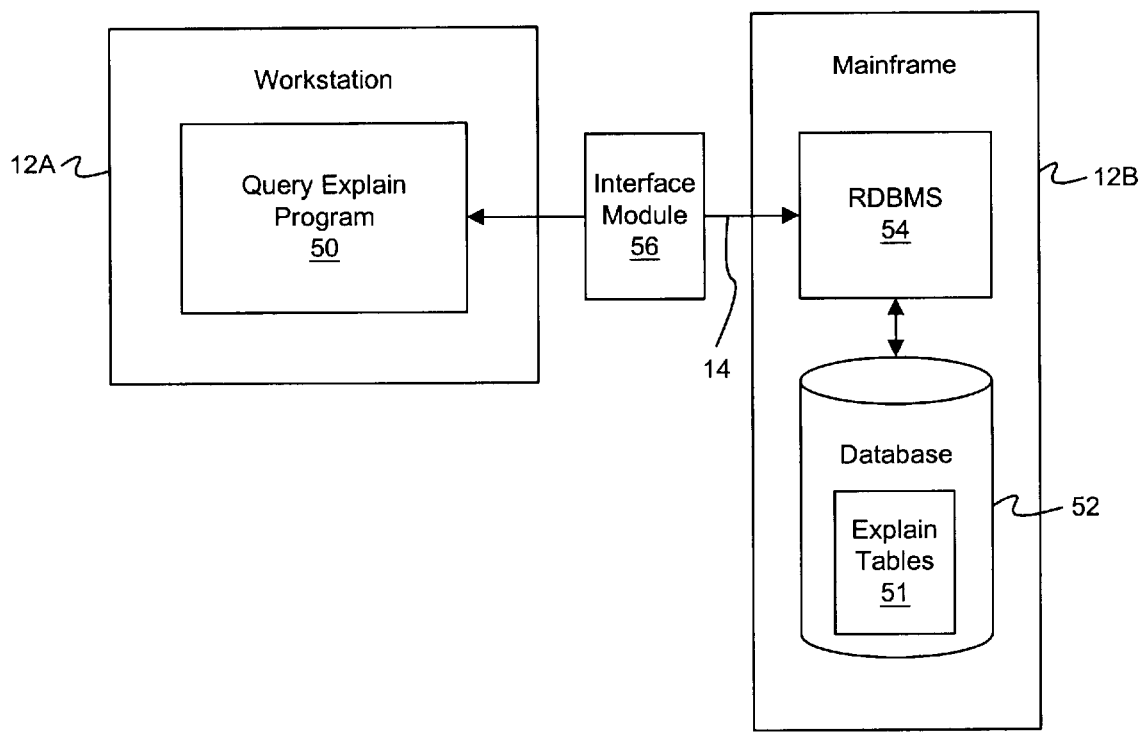
FIG. 2 is a schematic block diagram of a system for referencing a user-generated copy of a catalog according to one embodiment of the invention.

Referring now to FIG. 2, a schematic block diagram of one embodiment of the invention includes first and second computer stations 12A, 12B. The first computer station 12A is preferably a workstation-class computer, such as a PC™ workstation, available from IBM Corporation. The second computer station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention may be implemented using a variety of computing platforms and/or network architectures.

In one embodiment, the first computer station 12A includes a query explain program 50, which is a tool that assists a user in visualizing or otherwise understanding explain data for one or more queries to be executed. In one embodiment, the explain data is stored in one or more explain tables 51, which, as described hereafter, may include a plan table, a statement table, and a function table.

The second station 12B preferably stores the database 52, as well as a database system for managing the database 52. In the depicted embodiment, the database system comprises an RDBMS 54, one example of which is DB2® for OS/390®, available from IBM. Of course, other types of database systems could be used as well. As used herein, the term "database" may generically refer to a combination of the database system (e.g., RDBMS 54) and the database 52. In one embodiment, the query explain program 50 and the database system are linked via an interface module 56, such as DB2 Connect®, also available from IBM.

Figure 3:
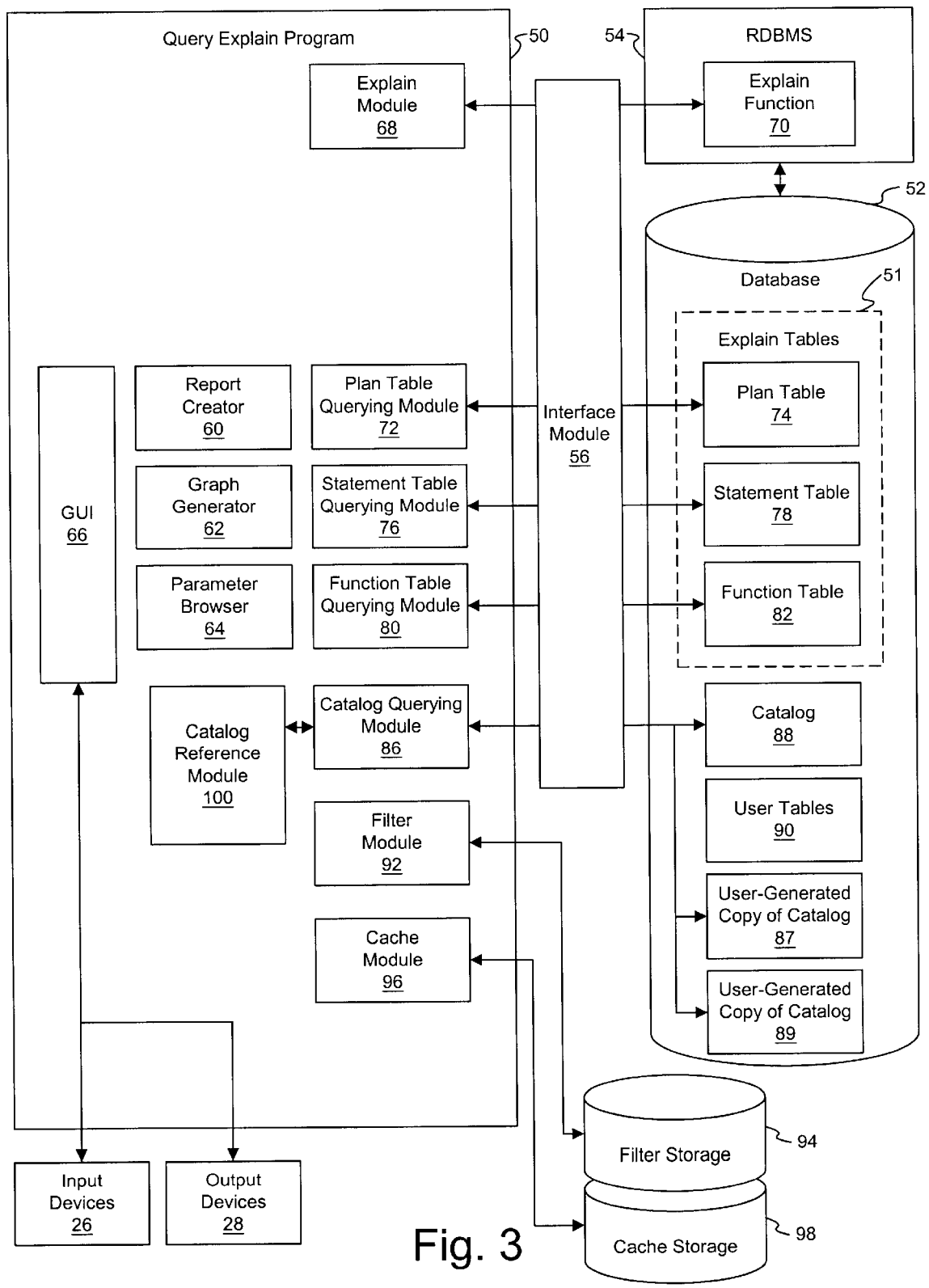
FIG. 3 is a schematic block diagram of a query explain program according to one embodiment of the invention.

Referring now to FIG. 3, the query explain program 50 preferably includes a plurality of modules containing executable and operational data suitable for operation within the memory devices 18 of FIG. 1. Of course, the memory devices 18 in which the modules of the present invention are located may also be distributed across both local and remote computer stations 12. Likewise, two or more illustrated modules may be integrated into a single module, or the function of a single module could be performed by a group of modules, without departing from the scope of the invention.

In one embodiment, the principal components of the query explain program 50 include a report creator 60, a graph generator 62, and a parameter browser 64. The above-described modules are, in one embodiment, intended to help the user to better understand the explain data, the subsystem parameters, and the like in a variety of ways.

"For example, the report creator 60 may be configured to selectively prepare a report of the explain data in an easily understood, text-based format. The user may be provided with the option of selecting one or more query statements, as well as subsets of the explain data for the selected query statements to include in the report. The report preferably provides the user with the requested explain data in a centralized and readily understood format, allowing the user to efficiently analyze and improve SQL query performance. One example of the report creator 60 is more fully described in co-pending U.S. patent application Ser. No. 09/482,595, filed Jan. 13, 2000, using Express Mail Label EL409135377US, for "System and Method for Selectively Preparing Customized Reports of Query Explain data," which is commonly assigned and is incorporated herein by reference."

Figure 4:
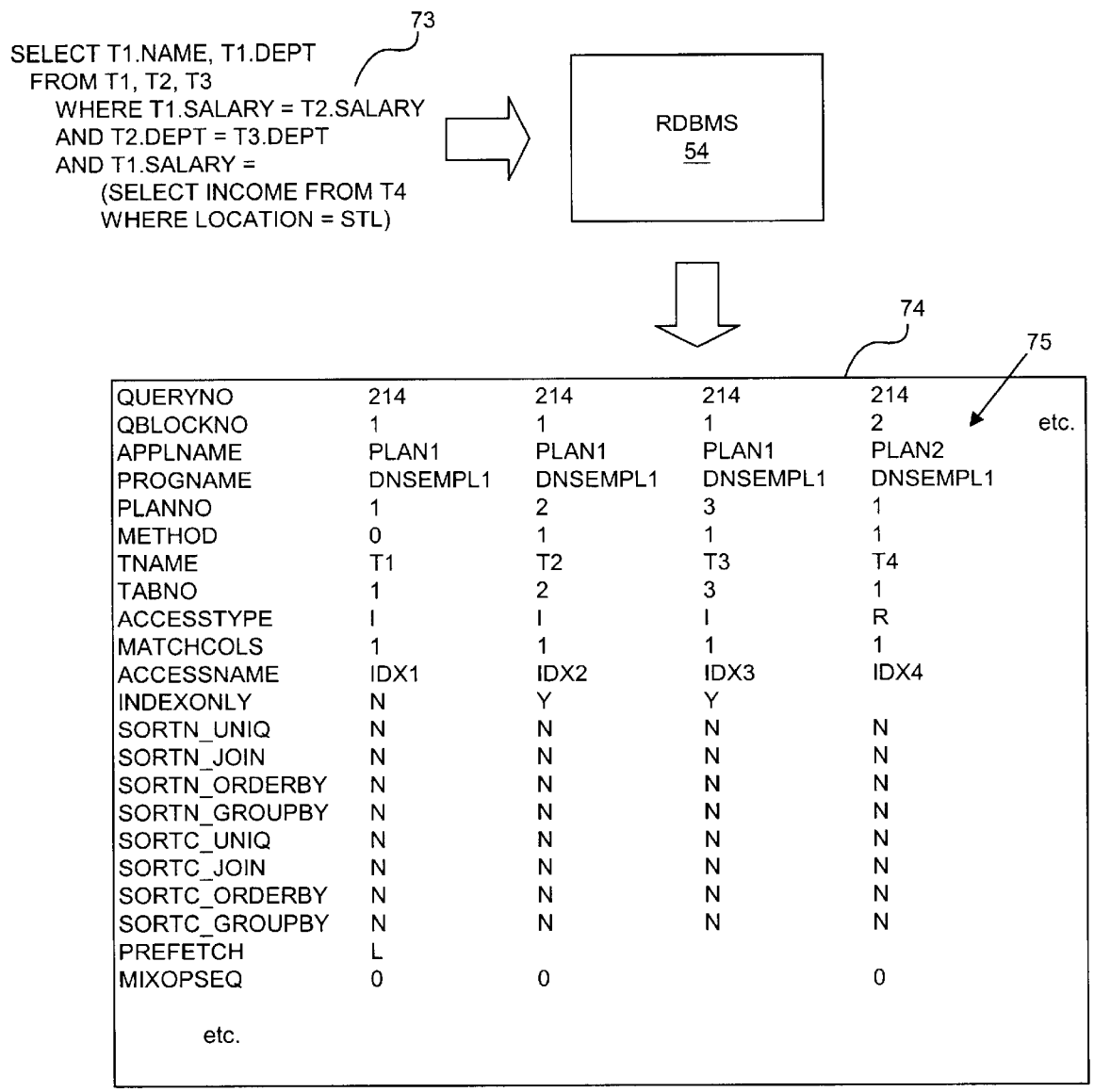
FIG. 4 is an illustration of a query statement and a portion of a plan table according to one embodiment of the invention.

FIG. 4 illustrates an exemplary SQL query statement 73. The Query statement of FIG. 4 is shown converted by an RDBMS 54 into access path data 75 and stored within a plan table 74 according to one embodiment of the present invention.

As shown in FIG. 5, the graph generator 62 in one embodiment uses data received from the plan table to generate a graphical representation of the access path. Preferably, access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information, including catalog information, related to the selected node is displayed on the right side of the display.

Referring again to FIG. 3, a third principal component of the query explain program 50 is the parameter browser 64. Preferably, the parameter browser 64 allows a user to selectively view the subsystem parameters, for example, the DSNZPARM and DSNHDECP values, used by a subsystem, as well as the install panel names and fields. Access to subsystem parameters is useful in analyzing the performance of query statements. Like the graph generator 62, the parameter browser 64 is more fully described in co-pending application Ser. No. 08/949,636, now U.S. Pat. No. 6,243,703 filed Oct. 14, 1997, for "Interpreting Data Using a Graphical User Interface."

The report creator 60, graph generator 62, and parameter browser 64 are each preferably coupled to a graphical user interface (GUI) module 66. Preferably, the GUI module 66 is operably coupled to the input and output devices 26, 28 to allow the user to interact with the report creator 60, graph generator 62, and parameter browser 64.

The query explain program 50 in the depicted embodiment also includes an explain module 68, which invokes a corresponding explain function 70 in the RDBMS 54. When invoked, the explain function 70 causes the RDBMS 54 to generate explain data for one or more explainable query statements.

In one embodiment, the explain tables 51 include subsets of query explain data for the explainable query statements. The query explain data preferably indicates how the RDBMS 54 will execute the query statements. For instance, in one embodiment, the explain tables 51 include a plan table 74 for storing access path data, a statement table 78 for storing statement cost data, and a function table 82 for storing data related to user-defined functions. The precise names of the tables are not relevant, and other tables including the same information are within the scope of the present invention.

Preferably, the explainable query statements include the searched form of the UPDATE and the DELETE statements and the SELECT and INSERT statements, but not the SELECT INTO statements. The explain module 68 is used to invoke an explain function 70 in which the RDBMS 54 immediately generates explain data for a specific SQL statement. This feature is useful for interactively testing specified SQL statements. Alternatively, the RDBMS 54 generates the explain data at bind time in the context of an application or package upon encountering an EXPLAIN (YES) option of the BIND command.

In one embodiment, the query explain program 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. Finally, a catalog querying module 86 queries the RDBMS catalog 88 to obtain object statistics for one or more database objects contained within a plurality of user tables 90.

In one embodiment, the above-described modules use the interface module 56 when communicating with the RDBMS 54 and database 52. Although the querying function is implemented herein by four separate modules, those skilled in the art will recognize that the described functionality may be implemented by more or fewer modules.

Preferably, the query explain program 50 also includes a filter module 92. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filtering criteria and save the named set of criteria to, and retrieve the set from, a filter storage 94.

In one embodiment, the filter module 92 also allows a user to filter the explain tables 51 themselves according to user-defined filters. In one embodiment, the filters are directed to data within one or more user-selected columns in the explain tables 51 and are used to selectively exclude rows of the tables 51 that do not satisfy the user-specified filtering criteria.

The query explain program 50 also preferably includes a cache module 96, which caches portions of the above-described tables in a cache storage 98. For example, when the plan table querying module 72 retrieves access path data from the plan table 74, the access path data is preferably stored, and future accesses to the same data will be retrieved from the cache storage 98. Various methods may be employed for managing data in the cache storage 98, such as automatically deleting a percentage of the cached data when the amount of the data exceeds a pre-defined threshold.

In a preferred embodiment under the present invention, and in order to effect the apparatus and method for integrally referencing a user-generated copy of a catalog in a database system of the present invention, the query explain program 50 also includes a catalog reference module 100 in communication with the catalog querying module 86.

Preferably, the catalog reference module 100 is configured to receive a user designation of a high level qualifier of a user-generated copy of the catalog 88 and pass the high level qualifier to the catalog querying module 86. In response, the catalog querying module 86, in lieu of querying the catalog 88 for information needed by the query explain program 50, queries a copy 87 of the catalog.

Users are able to make copies of the system catalog 88 and make user-generated copies 87, 89 thereof The users may then, rather than referring to the system catalog 88 for every need by a database system component, refer to one of the user generated copies 87, 89. Thus, the high rate of usage of the catalog 88 is bypassed, roadblocks at the catalog 88 are avoided, and response time of the database system component (such as the query explain program 50) may be increased.

Figure 6:
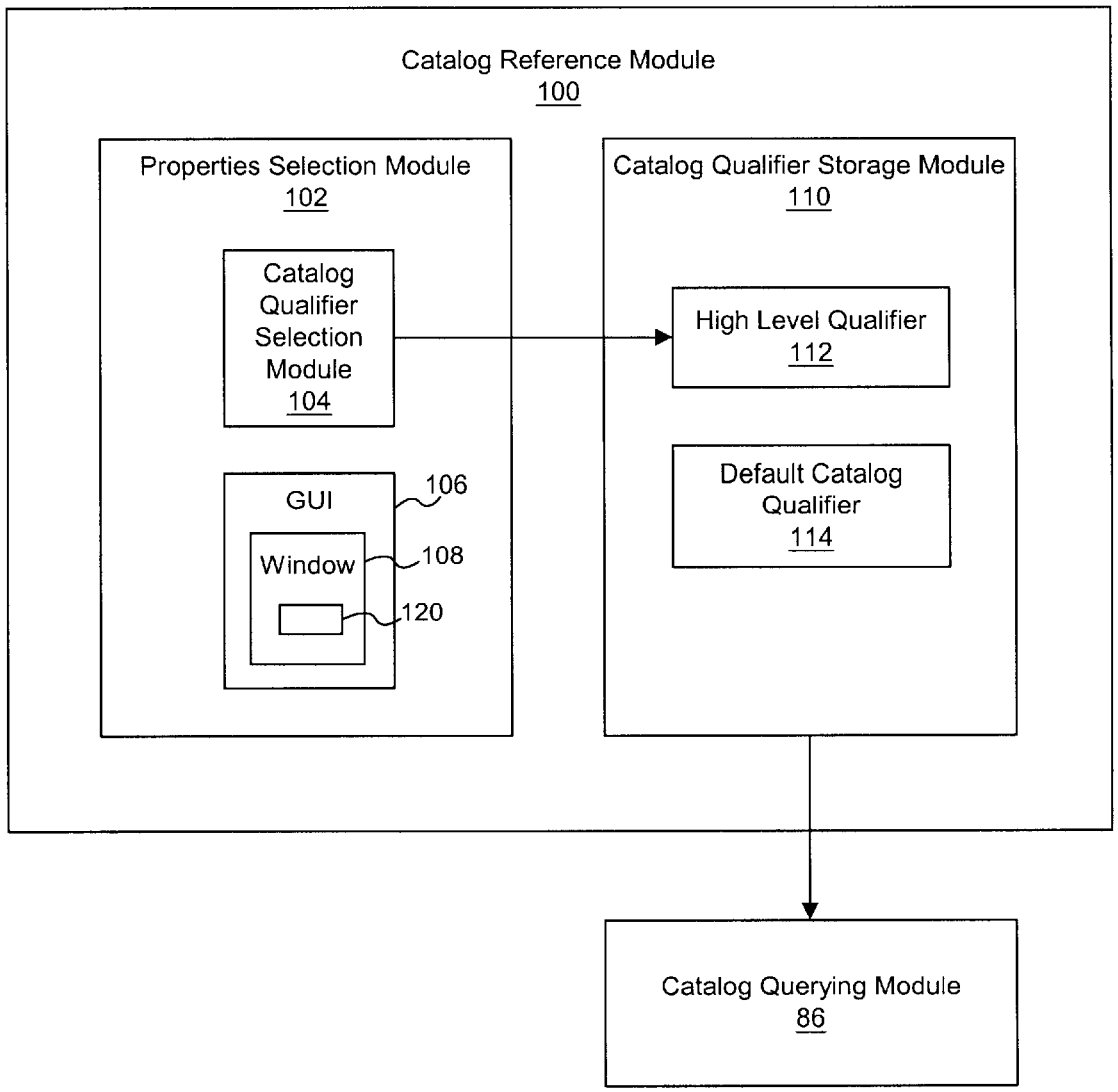
FIG. 6 is a schematic block diagram of a catalog reference module according to one embodiment of the invention.
Figure 7:
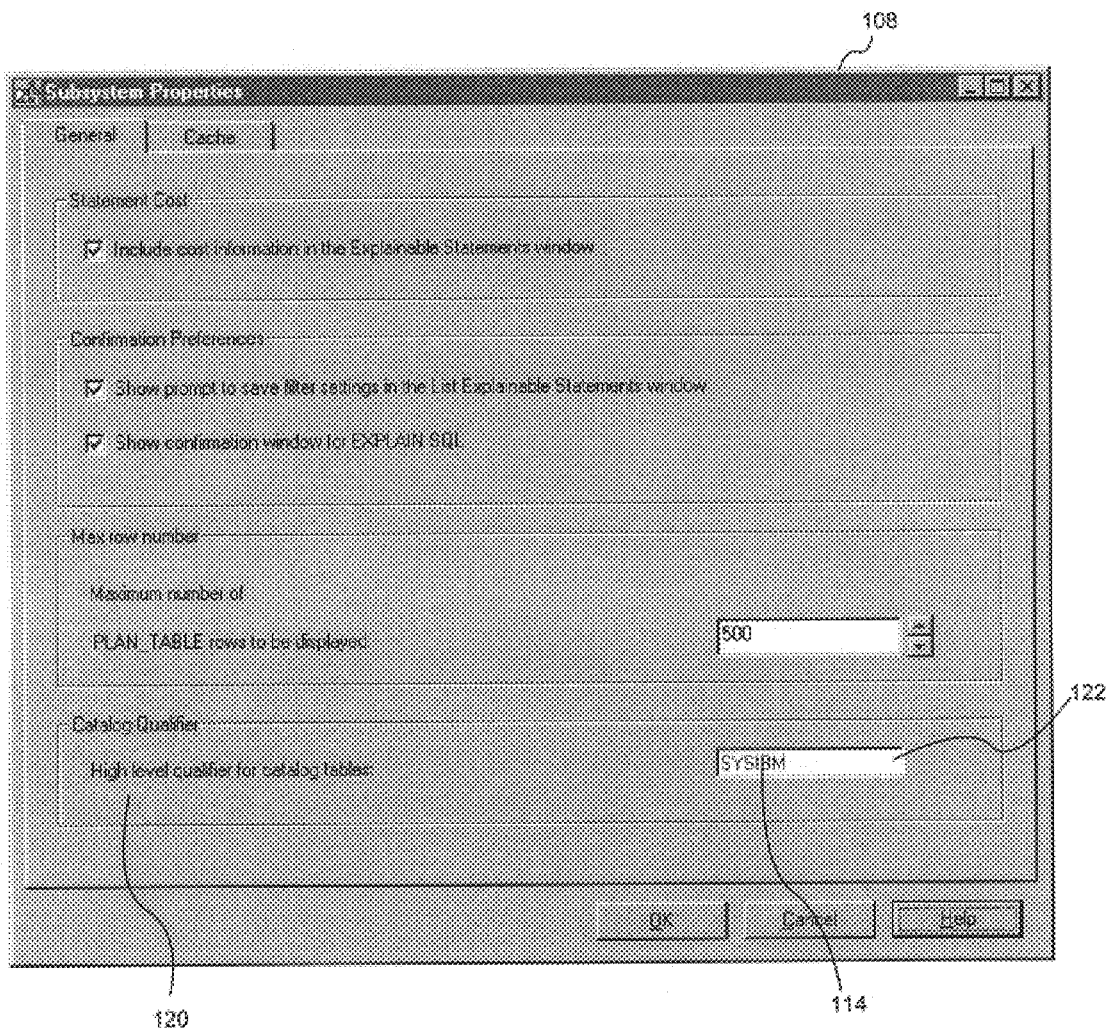
FIG. 7 is an illustration of an interactive display for designating a user-designated qualifier of a user-generated copy of a catalog according to one embodiment of the invention.

Referring now to FIG. 6, a schematic functional block diagram illustrates one manner of configuration of the catalog reference module 100 of FIG. 3. As shown therein, the catalog reference module 100 may comprise a properties selection module 102 and a catalog qualifier storage module 110. In the depicted embodiment, the properties selection module 102 is provided with a catalog qualifier selection module 104 and a graphical user interface (GUI) 106 comprising a window 108, one example of which is shown in FIG. 7.

The properties selection module 102 is preferably configured to allow a user to designate query explain program properties. Preferably, the properties selection module is configured to receive user designation of query explain program properties. Among these properties, is the designation of a high level qualifier of a catalog which the user wishes the query explain program 50 to consult when executing any of its catalog functions, examples of which are briefly described above. This user designation is preferably handled by the catalog qualifier selection module 104.

The catalog qualifier selection module 104 is preferably in communication with the window 108 to receive the user designation, and with a storage location for the catalog qualifier 112, such as the catalog qualifier storage module 110. The catalog qualifier storage module 110 also preferably comprises a default catalog qualifier 114, such as "SYSIBM," identifying the system catalog 88, such that if the user does not designate a high level qualifier 112 of a user-generated copy 87, 89, the default catalog qualifier 114 may be employed whenever the query explain program 50 has need of information from the catalog 88.

Thus, if a user designates, through the window 108, a high level qualifier 112 for a user-generated copy 87, 89, the designated copy 87, 89 will be referenced whenever the query explain program has need of catalog information. If a high level qualifier 112 is not designated by a user, or if the system catalog 88 is designated, the system catalog 88 will be referenced.

The catalog querying module 86 preferably handles all requests for catalog information from the query explain program 50, and consults the catalog qualifier storage module 110 whenever catalog information is requested.

In the depicted embodiment, the window 108 (which could also comprise any other suitable user interface device) comprises a plurality of controls for selecting query explain program properties. The query explain program properties may include user-specified preferences such as prompt suppression, row limits, a designation of a catalog qualifier, and the like.

One such control comprises a catalog qualifier designation control 120. As depicted in FIG. 7, the catalog qualifier designation control is labeled, and comprises a text insertion field 122 in which the high level qualifier of the requested table 87, 88, 89, 90 can be entered. The default catalog qualifier 114, "SYSIBM" is shown entered in the text insertion field 122, and preferably appears by default until changed by a user.

Figure 8:
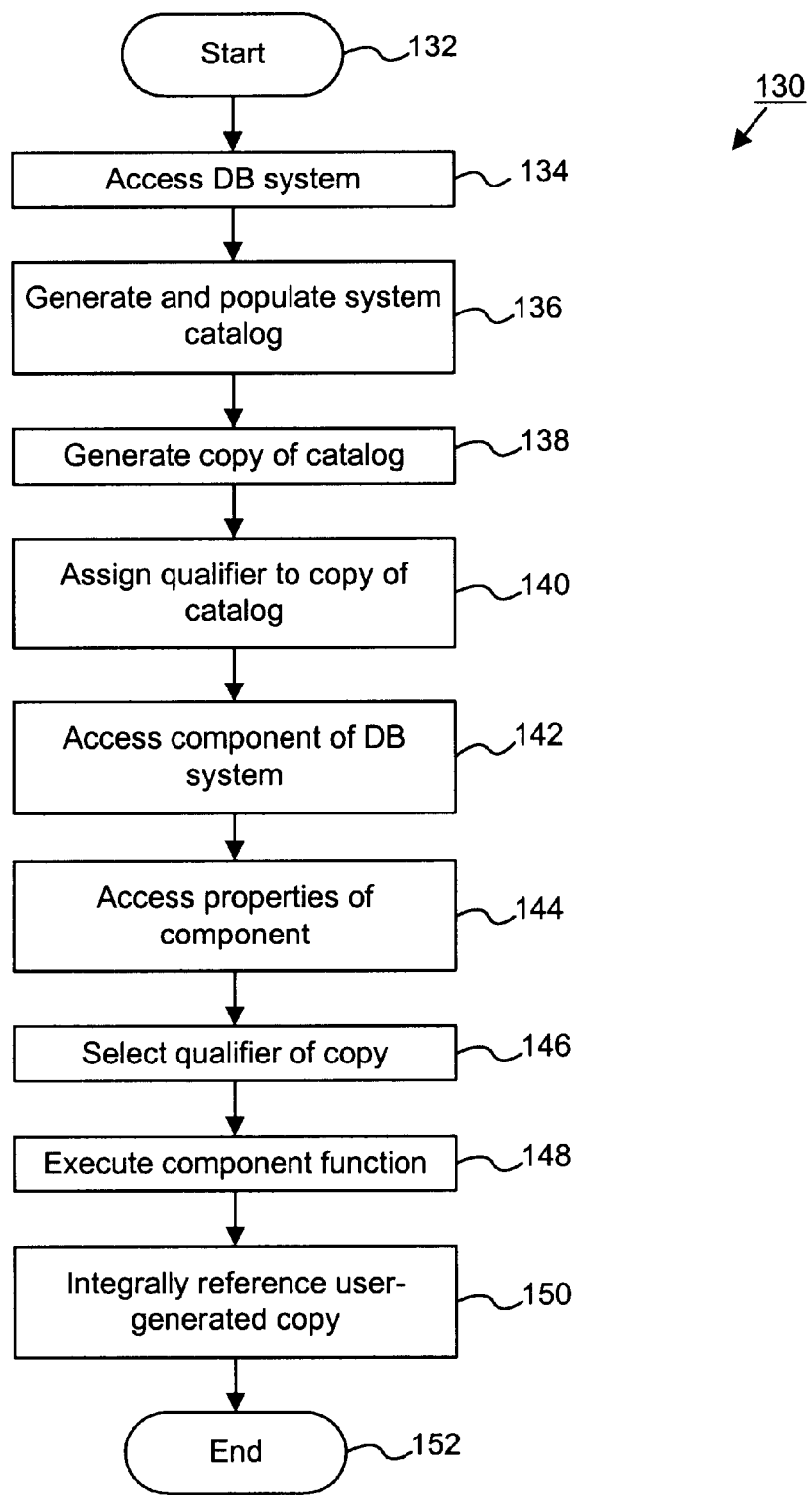
FIG. 8 is a schematic flow chart diagram of a method for integrally referencing a user-generated copy of a catalog in a database system.

Referring now to FIG. 8, a schematic flow chart illustrates a method of integrally referencing a user-generated copy of a catalog in a database system 54 according to one embodiment of the invention. The method 130 begins at a step 132 and progresses to a step 134. In the step 134, a database system, such as the RDBMS 54 of FIG. 2, or any other database system utilizing a catalog, is accessed. The access in the illustrated embodiments comprises a database system component module, such as a query explain program 50, operating in communication with the database system.

At a step 136, the system catalog 88 is generated and populated. As the catalog 88 is integral to the operation of the database 52 and the database system 54, the catalog 88 is typically generated when the database system 54 is installed on the computer station 12B (of FIG. 2). The population occurs as the database 52 is utilized and is an on-going process.

"At a step 138, a copy 87, 89 of the catalog 88 is generated. The generation of the copy 87, 89 may be conducted by the database system 54, but is preferably conducted by a user. Multiple copies 87, 89 may be generated, and different users may copy and modify individual copies 87, 89 to suit their needs. In order to identify the copies 87, 89 names are given to the copies 87, 89. Preferably, these names comprise high-level qualifiers, and are assigned in a step 140."

The names of catalog tables may comprise a high-level qualifier and one or more low-level qualifiers. For example, a DB2 catalog may contain table names, such as SYSIBM.SYSINDEXES, SYSIBM.SYSTABLES, SYSIBM.SYSPLANS, etc. In the above case, SYSIBM is a high-level qualifier, and SYSINDEXES, SYSTABLES, and SYSPLANS are low-level qualifiers. A copy of the catalog tables would preferably have a different high-level qualifier than the catalog, but the low-level qualifier would be the same so that the query explain program 50 still understands which catalog table is being accessed.

"At a step 142, the database system component is accessed. Typically, a user wishing to interact with the database system 54 executes a program such as the query explain program 50. At a step 144, the user configures the properties of the database system component. In one embodiment, this is conducted using the properties selection module 102, preferably through the window 108."

At a step 146, the user, in setting the properties, selects a high-level qualifier of a copy 87, 89 of the system catalog 88. In one embodiment, this is conducted by entering the qualifier 112 into the text insertion window 122 of FIG. 7. Alternatively, the qualifiers could be listed and selected, as with a pull down window. Any other suitable controls could also be used. Preferably, the selected qualifier is registered, and stored. In the depicted embodiment, the qualifier 112 is stored in the catalog qualifier storage module 110 of FIG. 6.

At a step 148, a function of the database system component requiring access to the information within the catalog 88 is executed. In one embodiment, this comprises the query explain program 50 receiving a command from a user to execute a function requiring the information from the catalog 88. Upon so doing, the catalog querying module 86 is consulted, and in turn consults the catalog qualifier storage module 110.

At a step 150, the user-generated copy is integrally referenced. In the depicted embodiments, this comprises the catalog querying module 86 receiving the high level qualifier 112 from the catalog qualifier storage module 110 and passing it on to the requesting function of the query explain program 50. The query explain program 50 then executes the function, referencing the catalog copy 87, 89 as if it were the system catalog 88. The method 130 ends at a step 152.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for integrally referencing a user-generated copy of a catalog in a database system, the apparatus comprising:
    a memory device having thereon modules of code for execution by a processor, the modules comprising:
        a database system component module configured to refer to a catalog generated by the database system; and
        a catalog qualifier designation module communicating with the database system component module and configured to receive a user designation of a user-specified name for a user-generated copy of the catalog generated by the database system to be referenced in place of the catalog generated by the database system.

2. The apparatus of claim 1, wherein the database system component module comprises a tool for use with the catalog system.

3. The apparatus of claim 2, wherein the database system component module comprises a graphical user interface module for relaying information regarding query execution to a user.

4. The apparatus of claim 2, wherein the database system is adapted for operation on a server and the database system component module is adapted for operation on a workstation communicating with the database system, and wherein the user-generated copy of the catalog is stored on the server.

5. The apparatus of claim 1, wherein the catalog qualifier designation module comprises a window accessible from the database system component module, the window comprising a control mechanism for receiving the user designation of a user-specified name in place of the original name of the catalog generated by the database system.

6. The apparatus of claim 1, further comprising a catalog referencing module adapted to communicate with the catalog qualifier designation module, receive the user-specified name for a user-generated copy of the catalog, and consult the user-generated copy of the catalog for use by the database system component module.

7. The apparatus of claim 6, wherein the catalog referencing module is adapted to reference the catalog generated by the database system in lieu of receiving the user-specified name for a user-generated copy of the catalog.

8. The apparatus of claim 1, wherein the user-specified name comprises a high level qualifier.

9. The apparatus of claim 8, wherein the high level qualifier designates the maker of the user-generated copy of the catalog.

10. The apparatus of claim 1, wherein the database system component module references the user-designated catalog integrally as if the user-designated catalog were the catalog generated by the database system.

11. A method of integrally referencing a user-generated copy of a catalog in a database system, the method comprising:
    receiving a user designation of a user-specified name for a user-generated copy of a catalog generated by the database system; and
    referencing the user-generated copy in place of the catalog generated by the database system, using the designated user-specified name.

12. The method of claim 11, further comprising creating a user-generated copy of the catalog created by the database system and giving the user-generated copy of the catalog a user-specified name.

13. The method of claim 11, wherein the step of receiving a user designation of a user-specified name comprises receiving a user designation of a user-specified name within a database system component module.

14. The method of claim 13, wherein the database system component module comprises graphical user interface module for relaying information regarding query execution to a user.

15. The method of claim 13, wherein the database system is adapted for operation on a server and the database system component module is adapted for operation on a workstation and for communicating with the database system, and wherein the user-generated copy of the catalog is stored on the server.

16. The method of claim 11, further comprising generating a graphical user interface window accessible from the database system component module, the window comprising a control mechanism for receiving the user designation of a user-specified name in place of the original name of the catalog generated by the database system.

17. The method of claim 16, further comprising referencing the catalog generated by the database system in lieu of receiving the user-specified name for a user-generated copy of the catalog.

18. The method of claim 11, wherein the user-specified name comprises a high level qualifier.

19. The method of claim 18, wherein the high level qualifier designates the maker of the user-generated copy of the catalog.

20. The method of claim 11, wherein referencing the user-generated copy comprises referencing the user-designated catalog integrally as if the user-designated catalog were the catalog generated by the database system.

21. An article of manufacture comprising a program storage medium readable by a processor and embodying one or more instructions executable by the processor to perform a method of integrally referencing a user-generated copy of a catalog in a database system, the method comprising:
    receiving a user designation of a user-specified name for a user-generated copy of a catalog generated by the database system; and
    referencing the user-generated copy in place of the catalog generated by the database system, using the designated user-specified name.

22. The article of manufacture of claim 21, wherein the method further comprises creating a user-generated copy of the catalog created by the database system and giving the user-generated copy of the catalog a user-specified name.

23. The article of manufacture of claim 21, wherein the step of receiving a user designation of a user-specified name comprises receiving a user designation of a user-specified name within a database system component module.

24. The article of manufacture of claim 23, wherein the database system component module comprises an graphical user interface module for relaying information regarding query execution to a user.

25. The article of manufacture of claim 23, wherein the database system is adapted for operation on a server and the database system component module is adapted for operation on a workstation and for communicating with the database system, and wherein the user-generated copy of the catalog is stored on the server.

26. The article of manufacture of claim 21, wherein the method further comprises generating a graphical user interface window accessible from the database system component module, the window comprising a control mechanism for receiving the user designation of a user-specified name in place of the original name of the catalog generated by the database system.

27. The article of manufacture of claim 26, wherein the method further comprises referencing the catalog generated by the database system in lieu of receiving the user-specified name for a user-generated copy of the catalog.

28. The article of manufacture of claim 21, wherein the user-specified name comprises a high level qualifier.

29. The article of manufacture of claim 28, wherein the high level qualifier designates the maker of the user-generated copy of the catalog.

30. The article of manufacture of claim 21, wherein referencing the user-generated copy comprises referencing the user-designated catalog integrally as if the user-designated catalog were the catalog generated by the database system.

* * * * *

UNITED STATES PATENT AND TRADEMARK OFFICE
CERTIFICATE OF CORRECTION

PATENT NO.    : 6,631,381 B1
DATED         : October 7, 2003
INVENTOR(S)   : Couch et al.

It is certified that error appears in the above-identified patent and that said Letters Patent is hereby corrected as shown below:

Column 7,
After line 20, a paragraph has been omitted and should read -- A further component of the query explain program 50 may comprise a graph generator 62, which is preferably configured to prepare a graphical representation of the access path of a query statement. One example of the graph generator 62 is more fully described in co-pending application Serial No. 08/949,636, filed October 14, 1997, for "Interpreting Data Using a Graphical User Interface," which is incorporated herein by reference. --

Column 9,
Line 12, "thereof The" should read -- thereof. The --.

Column 10,
Line 26, ""At" should read -- At --
Line 34, "140." " should read -- 140. --
Line 46, ""At" should read -- At --
Line 52, "108." " should read -- 108. --

Signed and Sealed this

Twenty-seventh Day of April, 2004

JON W. DUDAS
*Acting Director of the United States Patent and Trademark Office*